Figure 1:
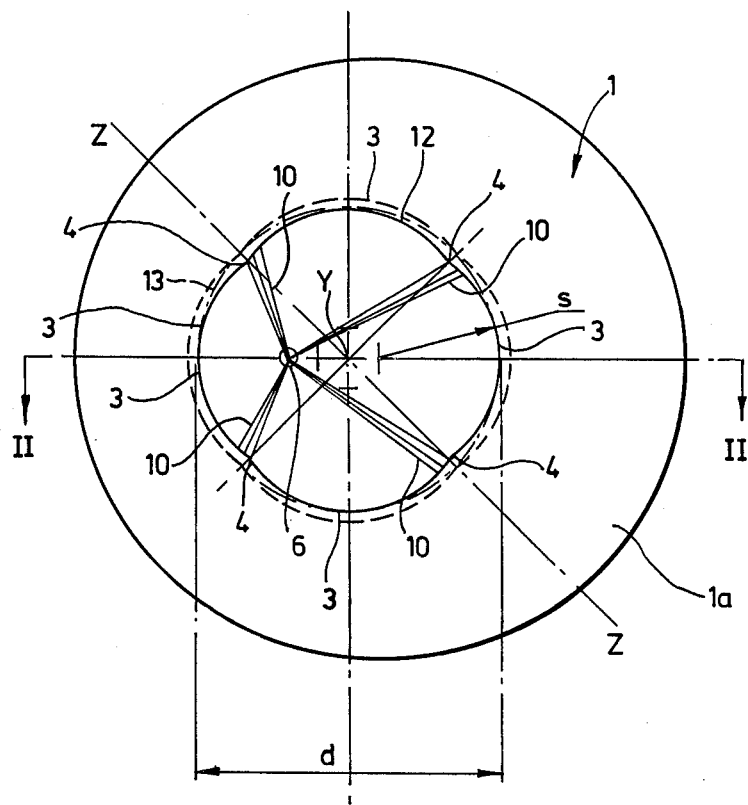

United States Patent [19]

Morris

[11] 4,083,330
[45] Apr. 11, 1978

[54] PISTON FOR AN INTERNAL COMBUSTION ENGINE

[75] Inventor: Alberto Jorge Morris, Dursley, England

[73] Assignee: R. A. Lister & Company Limited, Dursley, England

[21] Appl. No.: 737,528

[22] Filed: Nov. 2, 1976

[30] Foreign Application Priority Data

Sep. 23, 1976 United Kingdom ............... 39530/76

[51] Int. Cl.² ........................... F02B 3/00; F02B 23/00
[52] U.S. Cl. ................................. 123/32 B; 123/32 C; 123/191 SP; 123/193 P
[58] Field of Search ................. 123/30 A, 30 D, 32 A, 123/32 B, 32 C, 32 D, 32 ST, 33 D, 191 R, 191 SP, 193 R, 193 CP, 193 P

[56] References Cited

U.S. PATENT DOCUMENTS

| 2,828,724 | 4/1958 | Schneider | 123/32 A |
| 2,855,906 | 10/1958 | Galli | 123/32 B |
| 3,020,898 | 2/1962 | Hartmann | 123/32 B |
| 3,083,700 | 4/1963 | Madak | 123/32 A |
| 3,302,627 | 2/1967 | Morris | 123/30 D |
| 3,374,773 | 3/1968 | Scherenberg | 123/32 C |
| 3,814,068 | 6/1974 | Kimbara et al. | 123/32 A |
| 3,872,841 | 3/1975 | Kimbara et al. | 123/32 A |
| 3,892,221 | 7/1975 | Kimbara et al. | 123/32 ST |
| 3,945,351 | 3/1976 | Kimbara et al. | 123/32 B |

FOREIGN PATENT DOCUMENTS

| 1,078,961 | 11/1953 | France. |
| 696,371 | 8/1953 | United Kingdom. |

*Primary Examiner*—Charles J. Myhre
*Assistant Examiner*—William Randolph
*Attorney, Agent, or Firm*—Schuyler, Birch, Swindler, McKie & Beckett

[57] ABSTRACT

A piston for an internal combustion engine, said piston having a combustion chamber formed in its head, the combustion chamber having an inlet orifice in the top surface of the head, a flat bottom wall, and a side wall which includes a plurality of concave recesses which intersect to define cusps directed towards a central zone of the combustion chamber, said cusps including concavely curved portions which extend upwardly from the flat bottom wall and inclined portions which extend between the curved portions and the top surface of the head along the surface of an imaginary cone having its apex above said top surface.

8 Claims, 2 Drawing Figures

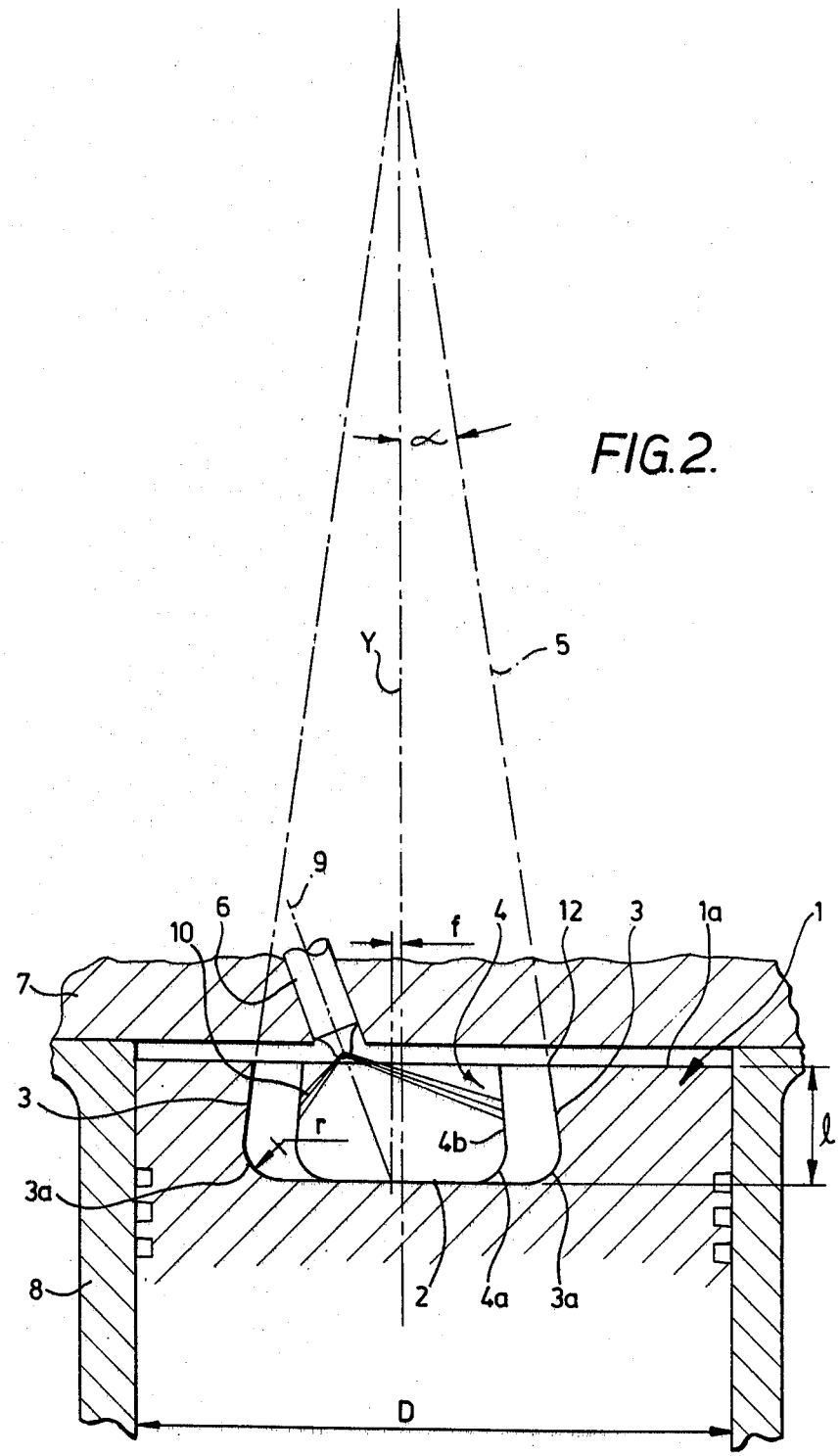

PISTON FOR AN INTERNAL COMBUSTION ENGINE

The invention relates to improvements in or relating to a piston for an internal combustion engine and is particularly concerned with a piston having a combustion chamber formed in its head.

It is, of course, well known to form a combustion chamber in the head of a piston (see, for example, our British Patent Specifications Nos. 696,371 and 1,012,924) which receives fuel injected through a spray nozzle. It is also well known to those skilled in the art that the slightest modification in shape of a combustion chamber can sometimes have a profound effect on characteristics such as starting ability, properties of exhaust gases at various loads, cool running and good low-power running. When designing a combustion chamber, it is essential that it can be manufactured economically as well as being able to provide the desired results. Whilst it is possible to design a combustion chamber which functions in a highly efficient manner, it may be so difficult to generate the combustion chamber in the piston head that manufacturing costs become excessive. Hitherto, for example as shown in FIG. 9 of French Patent No. 1,078,961, it has been proposed to form the combustion chamber in an insert which is to be located in a recess formed in the head of the piston. However, it is difficult to retain such an insert in position and almost impossible to maintain the necessary positional accuracy between the combustion chamber and the piston. Furthermore, the use of an insert increases manufacturing costs. Whilst the insert of French Patent No. 1,078,961 suffers from the foregoing disadvantages, it does include the useful feature of an inlet orifice for the combustion chamber which is smaller in diameter than the nominal diameter of the combustion chamber. However, the smaller diameter is achieved by means of a thin, inwardly directed lip adjacent the inlet orifice. The performance of the combustion chamber will depend significantly on the temperature of the immediate area of the combustion chamber surrounding the inlet orifice. In order to control the temperature within desirable limits, it is essential that heat be conducted away from the area to avoid overheating. However, the thin lip of the combustion chamber of the foregoing French Patent Specification will be subject to very high operational temperatures, particularly at its periphery, and such temperatures will have an adverse effect upon the vapourisation of fuel, the general process of combustion and, indeed, the metallic strength of the lip itself. Furthermore, there is a sharp transition between the combustion chamber wall and the lip, and this will almost certainly reduce turbulence in this very critical zone of the combustion chamber. Such adverse effect on turbulence is possibly mitigated by the provision of a conical bottom wall in the combustion chamber. However, the provision of such not only increases manufacturing costs, but also increases the inertia of the piston.

In our British Patent No. 1,012,924, the side wall recesses of the combustion chamber are concave in vertical section and, whilst this has proved satisfactory to a large extent, the concave recesses present a manufacturing difficulty and do not altogether overcome the problem of high temperatures at the lip around the inlet orifice of the combustion chamber. Furthermore, we are not entirely satisfied with the combustion achieved by such a combustion chamber particularly when used in engines having a cylinder bore of 85 mm and under as the fuel inlet nozzle tends to overheat, thus reducing the overall efficiency and reliability of the nozzle. At object of the present invention is to provide a combustion chamber in a small piston in which the disadvantages of our previous design, and those disadvantages mentioned in the immediately preceding paragraph, are substantially mitigated.

According to one aspect of the invention, there is provided a piston for an internal combustion engine, said piston having a combustion chamber formed in its head, the combustion chamber having an inlet orifice in the top surface of the head, a flat bottom wall, and a side wall which includes a plurality of concave recesses which intersect to define cusps directed towards a central zone of the combustion chamber, said cusps including concavely curved portions which extend upwardly from the flat bottom wall and inclined portions which extend between the curved portions and the surface of the head along the surface of an imaginary cone having its apex above said top surface.

Preferably, the portions of the recesses which intersect to define the inclined portions of the cusps form scallops around the inlet orifice, the scallops being contained within an imaginary circle on which lies the radial extremity of each scallop, and the diameter of the said imaginary circle defining an overall diameter of said inlet orifice equal to 50% to 60% of the diameter of the piston.

The portions of the recesses which intersect to define the inclined portions of the cusps are preferably part-conical, and the radius at the inlet orifice of the cone of which each recess is a part may be 40% to 45% of the overall diameter of the inlet orifice.

Preferably, the distance between the flat bottom wall and the inlet orifice when measured axially of the piston is 25% to 40% of the overall diameter of the inlet orifice.

The curved portion of each cusp at the zone where it blends with the flat bottom of the combustion chamber has a radius which, desirably, should be 45% to 55% of the axial distance between the flat bottom wall and the inlet orifice when measured axially of the piston.

The angle of inclination of the inclined portion of each cusp is preferably 5° to 10°, forming an acute angle with the flat bottom.

According to another aspect of the invention, an internal combustion engine includes a cylinder in which is mounted a reciprocatable piston, said piston having a combustion chamber formed in its head, the combustion chamber having an inlet orifice in the top surface of the head, a flat bottom wall, and a side wall which includes a plurality of concave recesses which intersect to define cusps directed towards a central zone of the combustion chamber, said cusps including concavely curved portions which extend upwardly from the flat bottom wall and inclined portions which extend between the curved portions and the top surface of the head along the surface of an imaginary cone having its apex above said top surface, the cylinder including an elongate inlet nozzle for liquid fuel inclined with respect to the main axis of the combustion chamber and positioned in the cylinder so that the axis of the inlet nozzle, when the piston occupies its top-dead-centre position in the cylinder, intersects the flat bottom wall of the combustion chamber closely adjacent the main axis of the combustion chamber.

The axis of the inlet nozzle preferably intersects the flat bottom wall at a point spaced from the main axis of the combustion chamber by a distance no greater than 4% of the aforesaid overall diameter of the inlet orifice.

The inlet nozzle may be arranged to spray liquid fuel at each cusp, or at the wall of the combustion chamber up to 20° to one side of each cusp.

The invention will now be described by way of example with reference to the accompanying drawings in which:

FIG. 1 is a plan view of a piston with a combustion chamber formed in its head, and FIG. 2 is a cross-section of the piston shown in FIG. 1 on the line II—II in FIG. 1 showing the piston in its top-dead-centre position in a cylinder.

A piston 1 has a combustion chamber formed in its head, the combustion chamber having a flat bottom 2 and a wall comprising four identical part-conical recesses 3. The recesses 3 have curved lower surfaces 3a which form smooth continuations of the flat bottom 2. The recesses 3 intersect to define four cusps 4, the cusps including curved portions 4a, and inclined portions 4b. The inclined portions 4b lie on the surface of an imaginary cone 5 having its apex above the top surface 1a of the piston head.

A fuel injection nozzle 6 is arranged at a suitable angle in a removable head 7 of a cylinder 8 for the piston 1. The nozzle 6 is positioned so that its axis 9 intersects the flat bottom 2 at a position closely adjacent the main axis Y of the combustion chamber, and is inclined in a vertical plane containing the line II—II. Alternatively, the nozzle 6 may be inclined in a vertical plane which contains line Z—Z shown in FIG. 1. The nozzle provides a number of sprays 10 which corresponds to the number of recesses 3, and the sprays are arranged to strike the recesses 3 of the combustion chamber either at the cusps 4 or up to 20° either side of the cusps. For optimum combustion performance, the angle at which the sprays strike the combustion chamber wall depends very much on the swirl and general turbulence of the combustion air and gases which, in turn, depend on the engine design characteristics.

The upper edges of the recesses 3 define a scalloped inlet orifice 12 for the combustion chamber, the radial extremities of the scallops lying on an imaginary circle indicated at 13. Unlike the orifice for the piston described in our British Patent No. 1,012,924 and in French Patent No. 1,078,961, the orifice is not in the form of a lip, and we achieve improved conduction of heat away from the orifice and better combustion performance. Furthermore, the straightforward shape of the combustion chamber of the present invention simplifies manufacture of the piston as formation of an orifice lip and a curved undersurface for the lip is avoided. The combustion chamber may be formed by machining the piston or formed during the piston casting process.

The combustion chamber of the present invention has also resulted in a useful reduction in working temperature of the nozzle 6. Compared with the piston described in our British Patent Specification No. 1,012,924, a nozzle working temperature reduction of approximately 30° C is achieved. This reduction in temperature improves engine reliability and prolongs the life of the nozzle.

Whilst the general configuration shown in the drawings achieves a substantial improvement in combustion over known pistons, the actual dimensions of the combustion chamber contribute substantially to the combustion performance. A satisfactory relationship between piston diameter D and overall inlet orifice diameter $d$ has been found to be, $d = 0.50$ to $0.60$ D. Having determined $d$ for a given piston diameter, the following range of proportions in terms of $d$ have been found satisfactory:

$l = 0.25$ to $0.40\ d$ $s = 0.40$ to $0.45\ d$ $f = 0$ to $0.04\ d$ in any direction round the combustion chamber main axis Y $r = 0.45$ to $0.55\ l$ The angle of inclination $\alpha$ of the inclined portion 4b of each cusp 4 with respect to the piston axis P is preferably 5° to 10°.

If desired, three, or five or more curved recesses 3 may be provided. As the number of recesses increases the ratio between $s$ and $d$ decreases.

As well as achieving lower nozzle and inlet orifice temperatures, the combustion chamber of the present invention makes a more effective use of the available air swirl, resulting in improved fuel consumption and clean exhaust gases.

What we claim as our invention and desire to secure by letters patent of the United States is:

1. An internal combustion engine including a cylinder in which is mounted a reciprocable piston, said piston having a combustion chamber formed in its head, the combustion chamber having an inlet orifice in the top surface of the head, a flat bottom wall, and a side wall which includes a plurality of concave recesses which intersect to define cusps directed towards a central zone of the combustion chamber, said cusps including concavely curved portions which extend upwardly from the flat bottom wall and inclined portions which extend between the curved portions and the surface of the head along the surface of an imaginary cone having its apex above said top surface, the portions of the recesses which intersect to define the inclined portions of the cusps forming scallops around the inlet orifice, the scallops being contained within an imaginary circle on which lies the radial extremity of each scallop, and the diameter of said imaginary circle defining an overall diameter of said inlet orifice equal to 50% to 60% of the diameter of the piston, the cylinder including an elongate inlet nozzle for liquid fuel inclined with respect to the main axis of the combustion chamber and positioned in the cylinder so that the axis of the inlet nozzle, when the piston occupies its top-dead-centre position in the cylinder, intersects the flat bottom wall of the combustion chamber at a point spaced from the main axis of the combustion chamber by a distance no greater than 4% of the overall diameter of the inlet orifice.

2. An internal combustion engine according to claim 1, in which the portions of the recesses which intersect to define the inclined portions of the cusps are part-conical.

3. An internal combustion engine according to claim 2, in which the radius at the inlet orifice of the cone of which the recess is a part is 40% to 45% of the overall diameter of the inlet orifice.

4. An internal combustion engine according to claim 1 in which the distance between the flat bottom wall and the inlet orifice when measured axially of the piston is 25% to 40% of the overall diameter of the inlet orifice.

5. An internal combustion engine according to claim 1, in which the curved portion of each cusp at the zone where it blends with the flat bottom of the combustion chamber has a radius which is 45% to 55% of the axial distance between the flat bottom wall and the inlet orifice when measured axially of the piston.

6. An internal combustion engine according to claim 1, in which the angle of inclination of the inclined portion of each cusp is 5° to 10°, forming an acute angle with the flat bottom.

7. An internal combustion engine, according to claim 1, in which the inlet nozzle is arranged to spray liquid fuel at each cusp.

8. An internal combustion engine, according to claim 1, in which the inlet nozzle is arranged to spray liquid fuel at the wall of the combustion chamber up to 20° to one side of each cusp.

* * * * *